United States Patent
Agam et al.

(10) Patent No.: US 10,487,565 B2
(45) Date of Patent: Nov. 26, 2019

(54) TIME OF FLIGHT (TOF) BASED DETECTING SYSTEM FOR AN AUTOMATIC DOOR

(71) Applicant: SENSOTECH INC., Montreal (CA)

(72) Inventors: Uri Agam, Montreal (CA); Pino Marcovecchio, Montreal (CA)

(73) Assignee: SENSOTECH INC., Montreal (CA)

( * ) Notice: Subject to any disclaimer, the term of this patent is extended or adjusted under 35 U.S.C. 154(b) by 0 days.

(21) Appl. No.: 16/367,507

(22) Filed: Mar. 28, 2019

(65) Prior Publication Data

US 2019/0218847 A1  Jul. 18, 2019

Related U.S. Application Data (63) Continuation of application No. PCT/CA2017/000213, filed on Sep. 29, 2017.

(Continued)

(51) Int. Cl.
  *E05F 15/73* (2015.01)
  *B66B 13/26* (2006.01)
  (Continued)

(52) U.S. Cl.
  CPC .............. *E05F 15/73* (2015.01); *B66B 13/26* (2013.01); *E05F 15/79* (2015.01); *G01S 7/4802* (2013.01); *G01S 17/023* (2013.01); *G01S 17/87* (2013.01); *G01S 17/89* (2013.01); *E05F 2015/432* (2015.01); *E05F 2015/763* (2015.01); *E05F 2015/767* (2015.01); *E05Y 2900/10* (2013.01);
(Continued)

(58) Field of Classification Search
  CPC ........................... E05F 15/78; E05F 2015/767
  See application file for complete search history.

(56) References Cited

U.S. PATENT DOCUMENTS

| | | |
|---|---|---|
| 3,997,866 A | 12/1976 | Taylor et al. |
| 5,387,768 A | 2/1995 | Izard et al. |

(Continued)

FOREIGN PATENT DOCUMENTS

| | | |
|---|---|---|
| CA | 2362326 A1 | 8/2000 |
| CN | 101540892 A | 9/2009 |

(Continued)

OTHER PUBLICATIONS

International Search Report issued for corresponding International Patent Application No. PCT/CA2017/000213, dated Jan. 9, 2018.

(Continued)

*Primary Examiner* — Catherine A Kelly
(74) *Attorney, Agent, or Firm* — Myers Wolin, LLC (57) ABSTRACT

A detecting system for an automatic door is provided including a TOF camera having a field of view that is limited in a first zone for a first purpose such as safety and in a second zone for another purpose such as activation or counting. The proposed system can be used for example in powered pedestrian doors, bus, rail, etc. In some embodiments, at least one ultrasound sensor system is further provided. The two technologies share hardware and information, resulting in improved safety and counting functions of the system, while reducing the amount of hardware used, space requirement and unit cost, and improving performance.

25 Claims, 11 Drawing Sheets

Related U.S. Application Data (60) Provisional application No. 62/403,631, filed on Oct. 3, 2016.

(51) Int. Cl.
| | | |
|---|---|---|
| *G01S 17/02* | (2006.01) | |
| *G01S 17/87* | (2006.01) | |
| *G01S 17/89* | (2006.01) | |
| *G01S 7/48* | (2006.01) | |
| *E05F 15/79* | (2015.01) | |
| *E05F 15/43* | (2015.01) | |

(52) U.S. Cl.
CPC ... *E05Y 2900/132* (2013.01); *E05Y 2900/506* (2013.01); *E05Y 2900/51* (2013.01)

(56) References Cited

U.S. PATENT DOCUMENTS

| | | | | |
|---|---|---|---|---|
| 6,084,367 | A * | 7/2000 | Landert | E05F 15/70 318/466 |
| 6,756,910 | B2 * | 6/2004 | Ohba | G01V 8/10 318/286 |
| 7,176,441 | B2 | 2/2007 | Sumitomo et al. | |
| 7,190,256 | B2 | 3/2007 | Pieper | |
| 7,400,744 | B2 | 7/2008 | Nichani et al. | |
| 7,684,018 | B2 | 3/2010 | Albers et al. | |
| 8,334,906 | B2 | 12/2012 | Lipton et al. | |
| 8,472,672 | B2 | 6/2013 | Wang et al. | |
| 8,819,992 | B2 | 9/2014 | De Coi et al. | |
| 8,868,376 | B2 | 10/2014 | De Coi | |
| 8,873,804 | B2 * | 10/2014 | Kawahata | G07C 9/00 382/103 |
| 8,875,441 | B2 * | 11/2014 | Agam | G01S 7/527 49/26 |
| 8,878,901 | B2 | 11/2014 | Meinherz | |
| 9,355,556 | B2 * | 5/2016 | Schockmel | G07C 9/00111 |
| 10,221,610 | B2 * | 3/2019 | Hsu | B66B 13/14 |
| 2007/0098253 | A1 | 5/2007 | Crespi et al. | |
| 2010/0097226 | A1 | 4/2010 | Parsons | |
| 2011/0298579 | A1 | 12/2011 | Hardegger et al. | |
| 2012/0092485 | A1 | 4/2012 | Meinherz et al. | |
| 2012/0119062 | A1 | 5/2012 | De Coi et al. | |
| 2012/0292514 | A1 | 11/2012 | Pfiffner | |
| 2013/0236058 | A1 | 9/2013 | Wang et al. | |
| 2013/0259306 | A1 * | 10/2013 | Lee | E05F 15/74 382/103 |
| 2014/0119594 | A1 | 5/2014 | Chou et al. | |
| 2014/0285309 | A1 | 9/2014 | Weidman | |
| 2014/0333769 | A1 | 11/2014 | Shibuya et al. | |
| 2015/0259966 | A1 * | 9/2015 | Sakai | E05F 15/73 49/31 |
| 2016/0289043 | A1 | 10/2016 | Fang et al. | |
| 2017/0193782 | A1 * | 7/2017 | Purohit | G08B 13/2494 |
| 2017/0292314 | A1 * | 10/2017 | Scheffer | B61D 19/00 |
| 2018/0329032 | A1 * | 11/2018 | Finn | G01S 7/40 |
| 2018/0363359 | A1 * | 12/2018 | Watanabe | E05F 15/73 |

FOREIGN PATENT DOCUMENTS

| | | | | |
|---|---|---|---|---|
| DE | 10260109 A1 * | 7/2004 | | E05F 15/42 |
| DE | 102005011116 A1 | 9/2006 | | |
| DE | 102006008513 A1 | 9/2007 | | |
| EP | 0935044 A2 | 8/1999 | | |
| EP | 1100050 A1 | 5/2001 | | |
| EP | 1619469 A1 | 1/2006 | | |
| WO | 2016042168 A1 | 3/2016 | | |

OTHER PUBLICATIONS

Written Opinion of the International Searching Authority issued for corresponding International Patent Application No. PCT/CA2017/000213, dated Jan. 9, 2018.

International Preliminary Report on Patentability issued for corresponding International Patent Application No. PCT/CA2017/000213, dated Jan. 18, 2019.

Iris-GmbH, "IRMA 3D: Ensures well-proven and reliable counting with high accuracy," iris Infrared Intelligent Sensors, https://www.irisgmbh.de, Sep. 2016, Berlin, Germany.

* cited by examiner

TIME OF FLIGHT (TOF) BASED DETECTING SYSTEM FOR AN AUTOMATIC DOOR

CROSS REFERENCE TO RELATED APPLICATIONS

This application is a continuation of International Patent Application No. PCT/CA2017/000213, filed on Sep. 29, 2017, which takes priority from U.S. Provisional Patent Application No. 62/403,631, filed Oct. 3, 2016, the contents of each of which are incorporated by reference herein.

TECHNICAL FIELD

The current disclosure concerns entrance management. More specifically, the current disclosure concerns machine vision systems and their application in passenger counting, automatic door activation and safety purposes.

BACKGROUND

Systems and methods are known in the art to detect the presence of a person or object at the entrance of an automatic door such as an elevator door or a pedestrian sliding door.

Example of such systems include infrared (IR) and/or microwave detector above the door which registers the increase of frequency of the emitted beam returning to the detector as a person moves towards the entrance, and more generally sense/calculate the motion coming from the objects to be detected.

Safety acoustic sensors are used for powered pedestrian doors, bus and train (transit) door safety, but lack a backup system and are prone to false alarm or lack of sensitivity due to unaccounted reflections and change in the speed of sound.

Furthermore, while an acoustic system can determine the distance to a target, it is ill suited to have sharp angle boundaries, lateral resolution and differentiate the nature of a detected target, whether it is a passenger or a suitcase or to determine the lateral position of the target. Also, due to pour spatial resolution, it does not differentiate well a target size. For example, a small object just under a sensor can give the same signal as a bigger object located at an angle, even though the distance is the same.

More recently, with the increasing power and speed of computer chips, 3D (three dimensional) cameras and other TOF (Time of Flight) based systems have begun to be used in detecting systems for automatic doors.

Examples of such systems are described in the following patent documents:
- International Patent Application Publication No. WO 2016/042168 A1, filed on Sep. 21, 2015, naming Harding et al. as the inventors and being titled "Door System with Sensor Unit and Communication Element";
- European Patent Application Publication No. 1 619 469 A1, filed on Jul. 22, 2004, naming Zambon as the inventor and being titled "Laser Scanning Device for Detection Around Automatic Doors; and
- U.S. Pat. No. 8,819,992, issued on Sep. 12, 2014 to De Coi et al. and being titled "Monitoring Apparatus and Pivoting Door".

Drawbacks of current TOF based detecting systems include the large quantity of data to process, even in single function systems, resulting in either a relatively slow response of the system or the limited precision thereof. The use of a TOF based detection system for safety and/or at least two of safety, activation and/or people counting purposes increases the above-identified problem. Other known drawbacks of such an application include miscounting due to shade, other visual artifacts, and blindness.

SUMMARY

The problem of the large quantity of data to consider in the use of a TOF camera detection system for an automatic door is solved by limiting the area of interest to zones which are parts of the field of view to a first zone for safety purpose and to a second zone for door activation purpose, and/or people counting, thus improving reliability and speed.

According to illustrative embodiments, there is provided a detecting system for an automatic door, the system comprising:
- at least one TOF (Time of Flight) camera for taking 3D (three-dimensional) images of
- a region near the automatic door;
- a controller coupled to the at least one TOF camera for:
  - receiving the 3D images from the at least one TOF camera;
  - inspecting first portions of the 3D images that correspond to a first zone within the region near the automatic door to determine first information related to a first aspect of a use of the automatic door; and
  - inspecting second portions of the 3D images that correspond to a second zone within the region near the automatic door to determine second information related to a second aspect of the use of the automatic door.

According to further illustrative embodiments, there is provided a detecting system for an automatic door, the system comprising a TOF camera having a field of view that is limited in a first zone for safety purpose and that is limited in a second zone for activation purpose.

The system includes one or a plurality of TOF cameras on a single side of the door or on both sides thereof. The use of a minimum of two cameras each on different sides of the door may require a reconstruction of the field of view (FOV) but results in i) a reduction of data processing due to the ability to ignore the door and ii) improved safety considering that the FOVs of both cameras overlap in the safety zone. It also allows to mount the camera above the door and therefore reduce the effect of the inherent dead zone for these systems.

The proposed systems can be used for example in powered pedestrian doors, bus, rail, etc.

According to some embodiments of the TOF based detection system, at least one ultrasound sensor system is further provided. The two technologies share hardware and information, resulting in improved reliability and safety and counting functions of the system, while reducing the amount of hardware used, space requirement and unit cost, and improving performance.

More specifically, in accordance to another illustrative embodiment, there is provided a detecting system for an automatic door, the system comprising:
- at least one TOF camera for taking 3D (three-dimensional) images of a region near the automatic door within a first spectrum;
- at least one additional sensor for sensing the region near the automatic door outside of the first spectrum; and
- at least one controller coupled to the at least one TOF camera and to the at least one additional sensor for:
  - receiving the 3D images;
  - analyzing portions of the 3D images that correspond to a zone within the region near the automatic door to determine first information related to a first aspect of a use of the automatic door; and analyzing signals from the at least one additional sensor to determine second information complementary to the first information in relation to the first aspect of a use of the automatic door.

Finally, in according to a further illustrative embodiment, there is provided a detecting system for an automatic door, the system comprising a TOF camera having a field of view that extends away from the TOF camera towards a floor under the automatic door within or near an entrance defined by the automatic door so as to define a light curtain; the light curtain having a configuration that is adaptable depending on predetermined criteria.

Other objects, advantages and features of illustrative embodiments of TOF based detecting system for an automatic door will become more apparent upon reading the following non-restrictive description of illustrated embodiments thereof, given by way of example only, with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

The present invention concerns a TOF based detecting system mounted to a door, to a door frame or adjacent thereto, to detect a body such as a person, a vehicle, parcels in or near the entrance or the door path defined by the door.

It is to be noted that the expression "body" is to be construed herein and in the appended claims as including a person, an animal, a limb and an object, such as, without limitation, a parcel and a bag or any part thereof.

The expression "door assembly" is to be construed herein and in the appended claims as including a door or a plurality of doors mounted to a door frame or more generally a door or a plurality of doors assembled together so as to selectively close an entrance.

The expression "door" is to be construed herein and in the appended claims as including any panel made from any material and having any shape and sizes which removably blocks an entrance.

The expression "automatic door" is to be construed herein and in the claim as a door that automatically opens and closes, for example through an electromechanical system when a person or object moves towards the entrance defined by the door.

The expression "door frame" is to be construed herein and in the appended claims as including any structural elements used to operatively mount the door, including a wall, a floor, a ceiling, a combination thereof and any assembly of beams, or mechanical parts.

The expression "target" is to be construed herein and in the appended claims as a body that enters a field of view and having characteristics that correspond to predetermined criteria for detection purposes.

Figure 1:
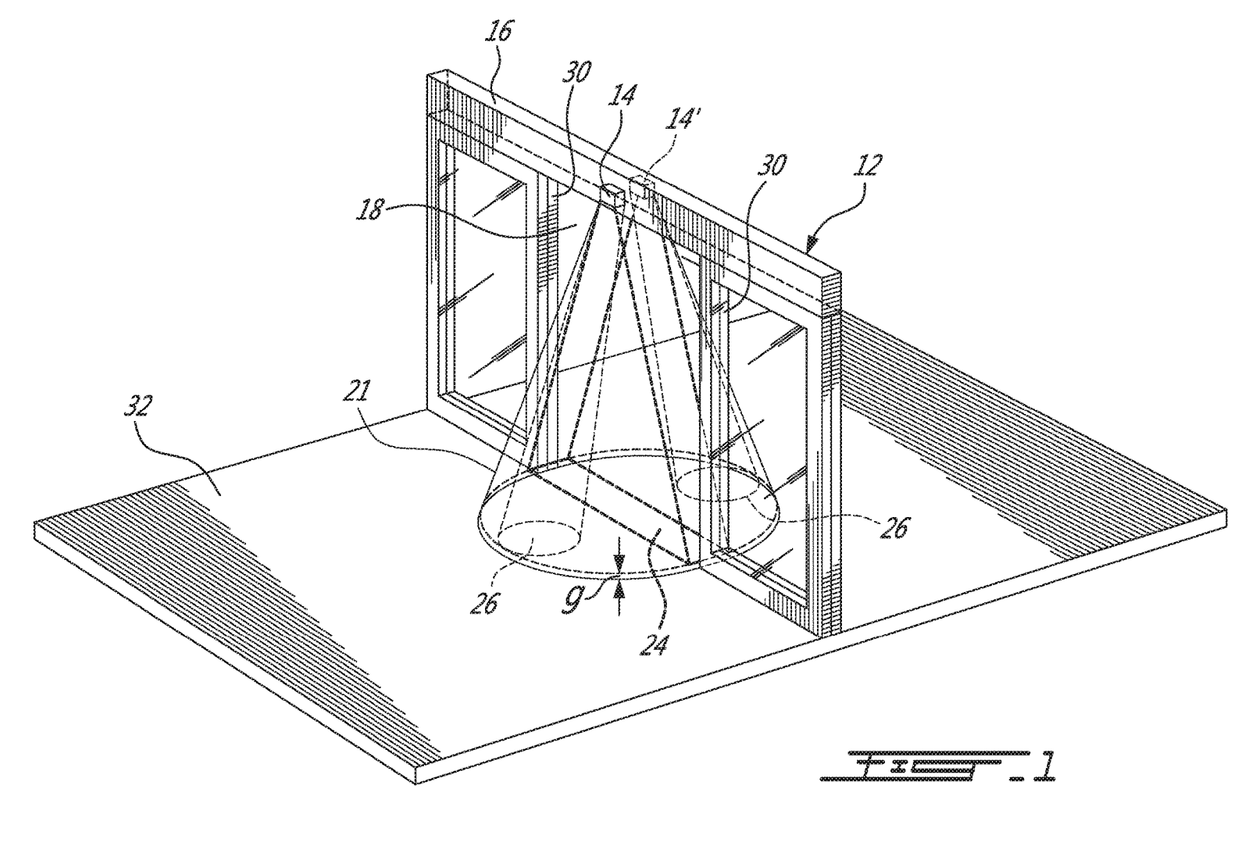
FIG. 1 is a perspective view of an automatic door assembly provided with a TOF (Time of Flight) based detecting system according to a first illustrative embodiment having two TOF cameras, one on each side of the door, and illustrating the safety zone and the two door activation zones; the door being shown fully opened.
Figure 2:
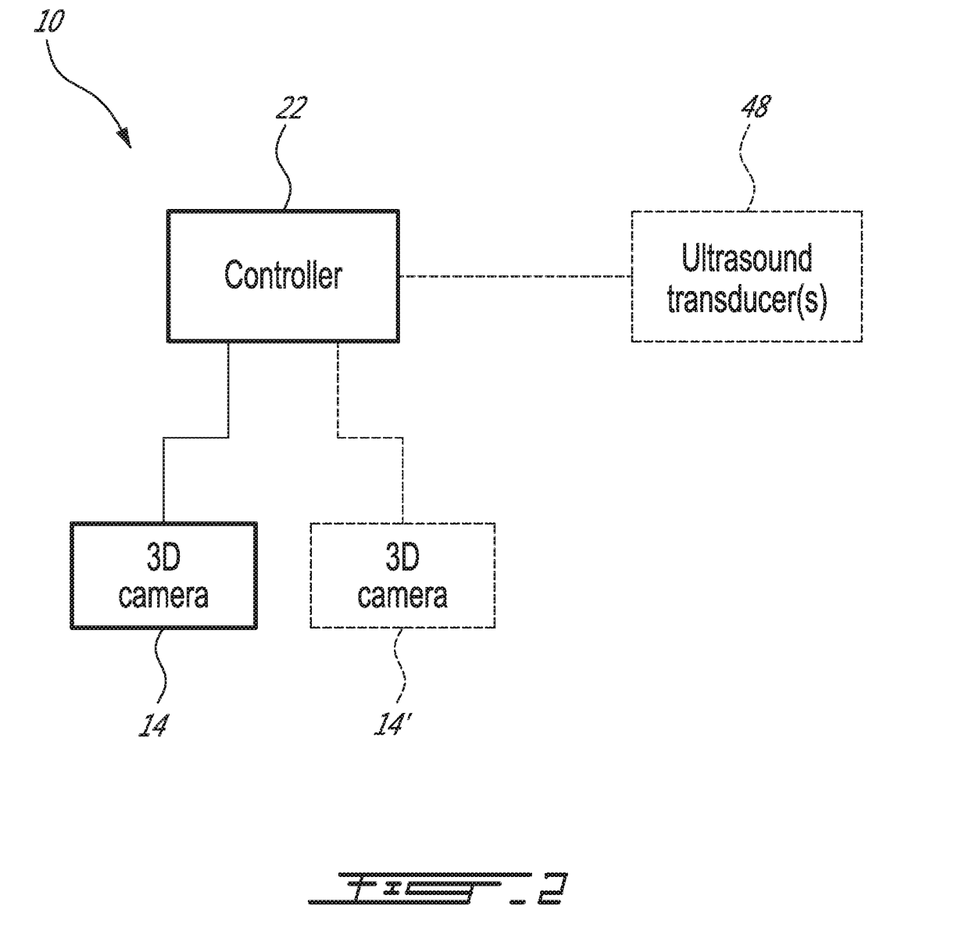
FIG. 2 is a block diagram of the TOF based detecting system from FIG. 1, further illustrating the optional use of ultrasound transducers in a dual mode of operation.

A TOF (Time of Flight) based detecting system 10 for an automatic sliding door 12 according to a first illustrative embodiment will now be described with reference first to FIGS. 1 to 3 of the appended drawings.

According to the first illustrative embodiment, the TOF based detecting system 10 comprises two TOF cameras 14-14', each one mounted on a door frame 16 above a door entrance 18 of the sliding door 12. The two 3D cameras 14-14' have overlapping or physically separated field of views. An image processing algorithm is used to combine the images coming from both cameras 14-14' into a single composite image. The resulting FOV 21 can be made as big as the sum of both cameras' field of views or smaller, wherein the safety zones provided by the two cameras FOV overlap and therefore provide to safe vital configuration.

Such a use of two TOF cameras allows reducing the door obstruction on the image while the door 12 closes and therefore reducing processing time and increasing reaction speed.

Since image processing algorithms are believed to be well-known in the art, they will not be described herein in more detail for concision purposes.

The TOF based detecting system 10 further comprises a controller 22 that is coupled to both TOF cameras 14-14' so as to receive images therefrom in a continuous feed manner.

Each TOF camera 14 or 14' includes several illuminating diodes and a 2D (two dimensional) receiver in the form of CCD (Charged Couple Device) cameras. According to another embodiment (not shown), the TOF cameras 14 are from another type than CCD cameras.

Since TOF cameras are believed to be well known in the art, they will not be described herein in more detail for concision purposes.

According to the illustrated embodiment, the TOF based detecting system 10 is configured to generate a safety zone 24, two (2) door activation zones 26, and a counting zone 27, all within the full FOV 21.

The safety zone 24, the two (2) door activation zones 26 and the counting zone 27 are defined by respective selected portions of the 3D images gathered by the two sensors 14-14' and more specifically selected pixels therefrom. The whole of pixels in the 3D images from the two sensors 14-14' is therefore not considered by the controller 22 in its analysis thereof.

More specifically, the controller 22 inspects first pixels of the 3D images that correspond to the safety zone 24 so as to determine information related to a safe use of the automatic door 12, and second pixels of the 3D images that correspond to the activation zones 26 so as to determine information related to the presence of person or target in view of activating the door 12. When a target is identified by one of the two activation zones 26, then the displacement of the target is followed in the counting zone to determine whether a number of persons crossing the door 12 should be incremented, decremented or stay the same.

The safety zone 24 is defined by a volume between the two sliding door panels 30 that extends within the full FOV 21 i) transversally a predetermined distance from the entrance 18, equidistant on both sides thereof, and ii) from a small distance 'g' from the floor 32, up to the upper limit of the full FOV 21.

The distancing of the activation zones 26 from the floor 32 allows ignoring the portions of the 3D images that correspond to the floor 32 so as to minimize the occurrence of false targets due to reflections from the floor 32. A distance 'g' as small as one pixel has been found to be sufficient to prevent reflections from the floor 32. The gap 'g' can also be of a different length than illustrated or omitted.

An image analysis is performed by the controller 22 to identify a target moving towards the defined safety zone 24 between the two panels 30. A conventional image data analysis software/algorithm is implemented on the controller 22 for such a task. Since such a data analysis is believed to be well known in the art, it will not be described herein in more detail for concision purposes. The safety analysis is not performed when the door 12 opens.

The controller 22 can be in the form of a solid-state device or a computer implementing the 3D data analysis functionalities required. The controller 22 is further configured for receiving and storing image data from the TOF cameras 14-14'.

Figure 3:
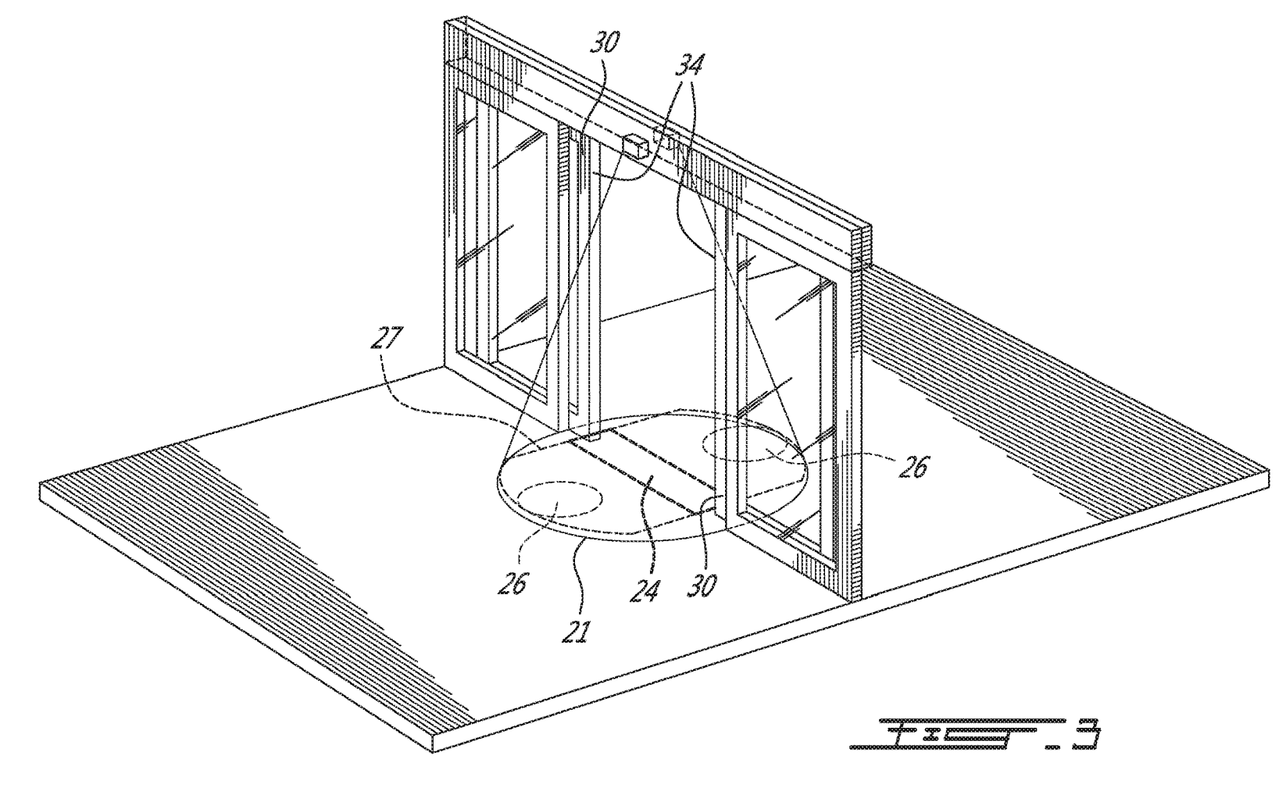
FIGS. 3-5 are perspective views, similar to FIG. 1, showing the counting zone and the adaptation of the safety zone as the door closes.
Figure 4:
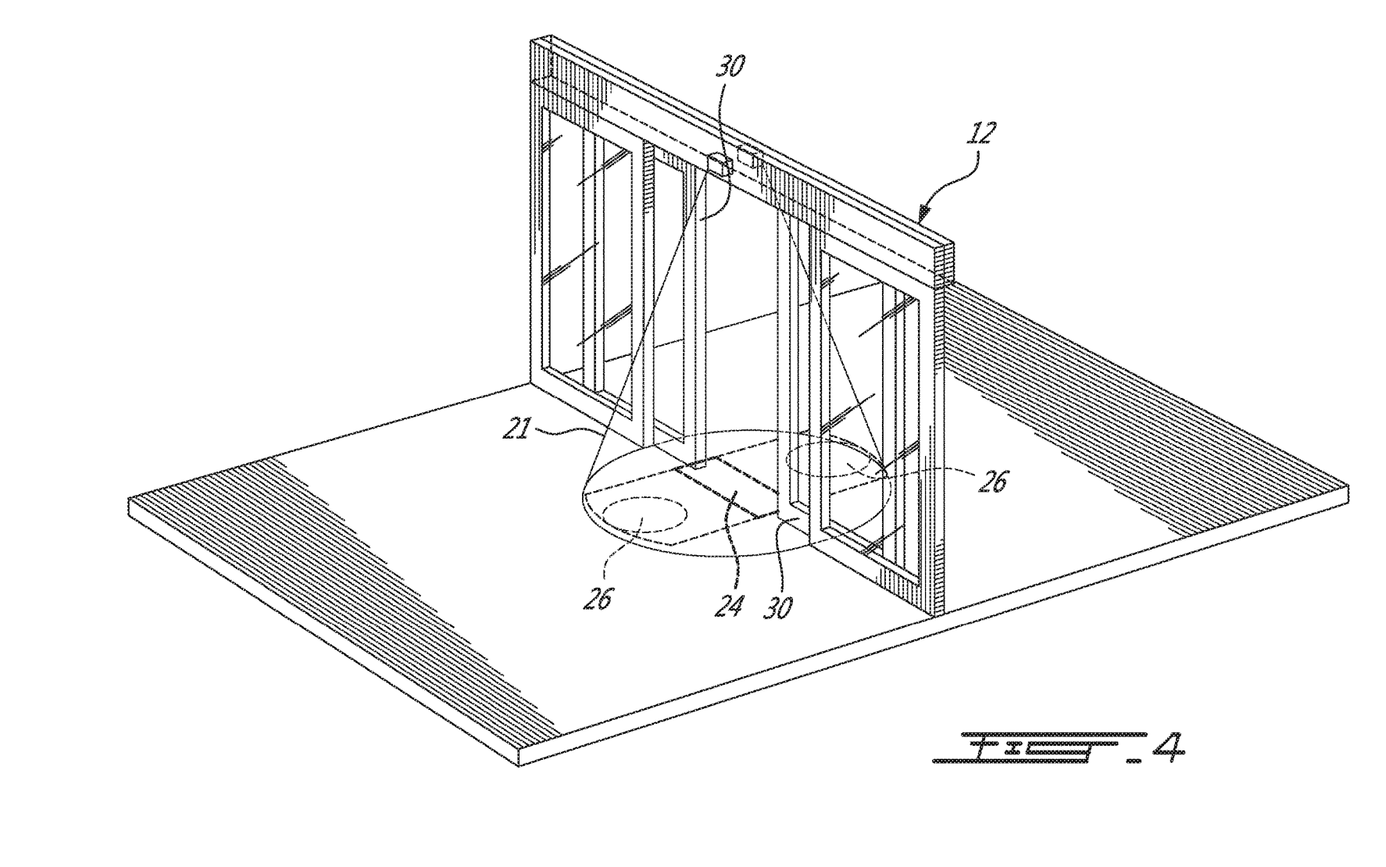
Figure 5:
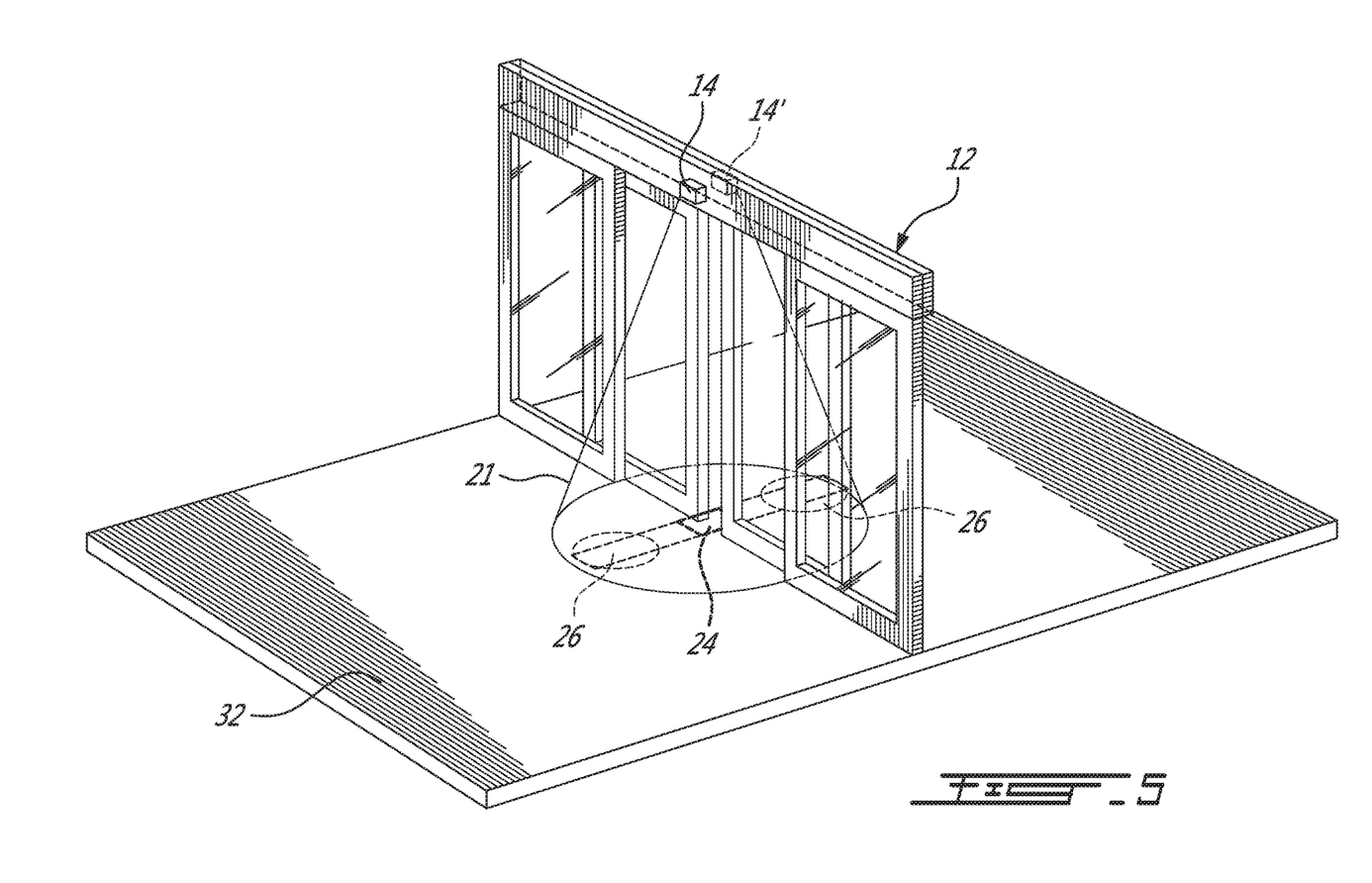

As illustrated in FIGS. 3 to 5, the volume of the safety zone 24 is adapted according to the position of the door panels 30 as they move. More specifically, the safety zone 24 is adapted so as to remain laterally within the width defined by interspace between the moving edges 34 of the door panels 30. It results that less data is considered for safety analysis purposes by the controller 22 as the door panels 30 close. It is to be noted that only the projections of the safety and control zones 24 and 26 are shown on FIG. 3 so as to alleviate the view.

The position of the door panels 30 is determined either by a further image analysis in the full FOV 21 or by an encoder (not shown) provided on the door 12 and coupled to the controller 22.

The system controller 22 is further coupled to the door activation controller (not shown) or is further configured to act as a door activation controller to cause the door 12 to open when a target (not shown) enters the safety zone 26.

The same is true when a target enters either one of the two activation zones 26.

The activation zones 26 are positioned on each sides of the entrance 18, centered with the door entrance 18 and are each defined by a limited FOV of a respective camera 14 or 14'. Each activation zone 26 is generally in the form of a cone that extends within the overall FOV 21 from the cameras 14 or 14' to the distance 'g' from the floor 32. The cones 26 are titled away from the door 12 so that the lowest section of each cone 26 is transversally distanced from the door 12.

The projection of the counting zone 27 on the lowest section of the full FOV 21 can be seen in FIG. 3. The counting zone 27 is defined by the volume of the full FOV 21 truncated on both lateral sides by the lateral positions of the door panels 30. As such, the counting zone 27 is adapted to the position of the panels 30, similarly than the safety zone 24.

When a target (not shown) is detected by the controller 22 in the counting zone 27 on either side of the entrance 21, the displacement of the target is tracked to verify whether it crosses the entrance 21 and a number of persons/passengers crossing the entrance 21 is incremented or decremented, depending on the direction of displacement of the target and predetermined criteria. Such criteria include without limitations, the nature of the target as determined by the system 10.

The system 10 may be configured to trigger off the counting functionality and to ignore the counting zone 27, for example when the door 12 is closing, and then until the opening of the door 12 reaches a certain width.

Similar criteria can be used to trigger on or off the safety and activation zones 24 and 26 and functionalities.

Even though the system 10 according to the first illustrated embodiment includes two (2) activation zones, one on each sides of the entrance, a TOF based detecting system according to another embodiment may include a different number and different location of activation zones, including a single one on one side of the door 12.

Any one of the activation, counting and safety zones 26, 24 and 27 can be omitted and or modify. Also, other limited zones within the FOV of the cameras can be defined to detect targets corresponding to other predetermined criteria.

While the system 10 according to the first illustrative embodiment has been defined as being adaptive to the door panels position, such a feature can be omitted. Also, a TOF based detecting system according to another embodiment can be alternatively or additionally configured to be adaptive according to other criteria.

In some embodiments, the adaptive change in the configuration of the safety zone 24, activation zones 26 and/or counting zone 27 occurs on one side of the door 12 only or differently on both sides thereof.

For example, a TOF based detecting system for an automatic door according to another embodiment is configured to detect any target within either one of the detecting zones 24, 26 and 27 that appears to be fixed according to predetermined criteria. Such criteria can be based for example on the displacement (or lack thereof) of an identified target, its size, position within the zone, any combination thereof, etc. An example of such an identified target may correspond to a person (not shown) that stays nearly still near the door 12 for lack of movement opportunity, for example in a crowd near the entrance 18 defined by the door 12. Such an identified target becomes a fixed target and is ignored by the system 10 for safety, activation and/or counting purposes until it stops corresponding to the predetermined criteria.

As a further example, when a side of the entrance 18 is found by the system 10 to be crowded, the configuration and/or position of anyone of the safety 24, activation 26 and counting 27 zones can be changed to limit or prevent false detections.

Whether the adaptation concerns a fixed target, the position of the door panels or the like, it is achieved either by a change in the position or shape of the zone or the number of pixels constituting the latter, or any combination thereof.

Figure 6A:
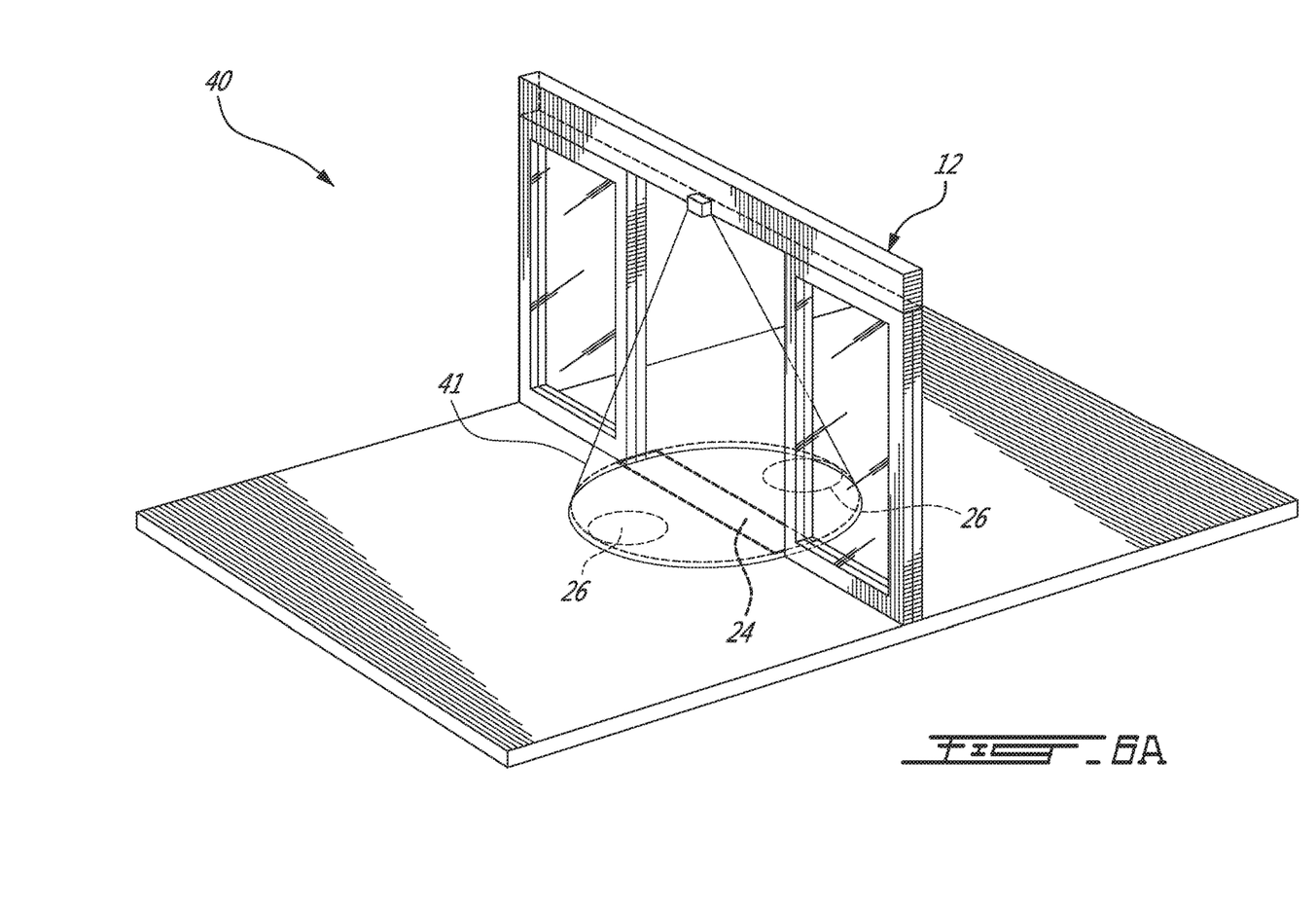
FIGS. 6A-6B are perspective views of an automatic door assembly provided with a TOF based detecting system according to a second illustrative embodiment, illustrating the use of a single TOF camera.
Figure 6B:
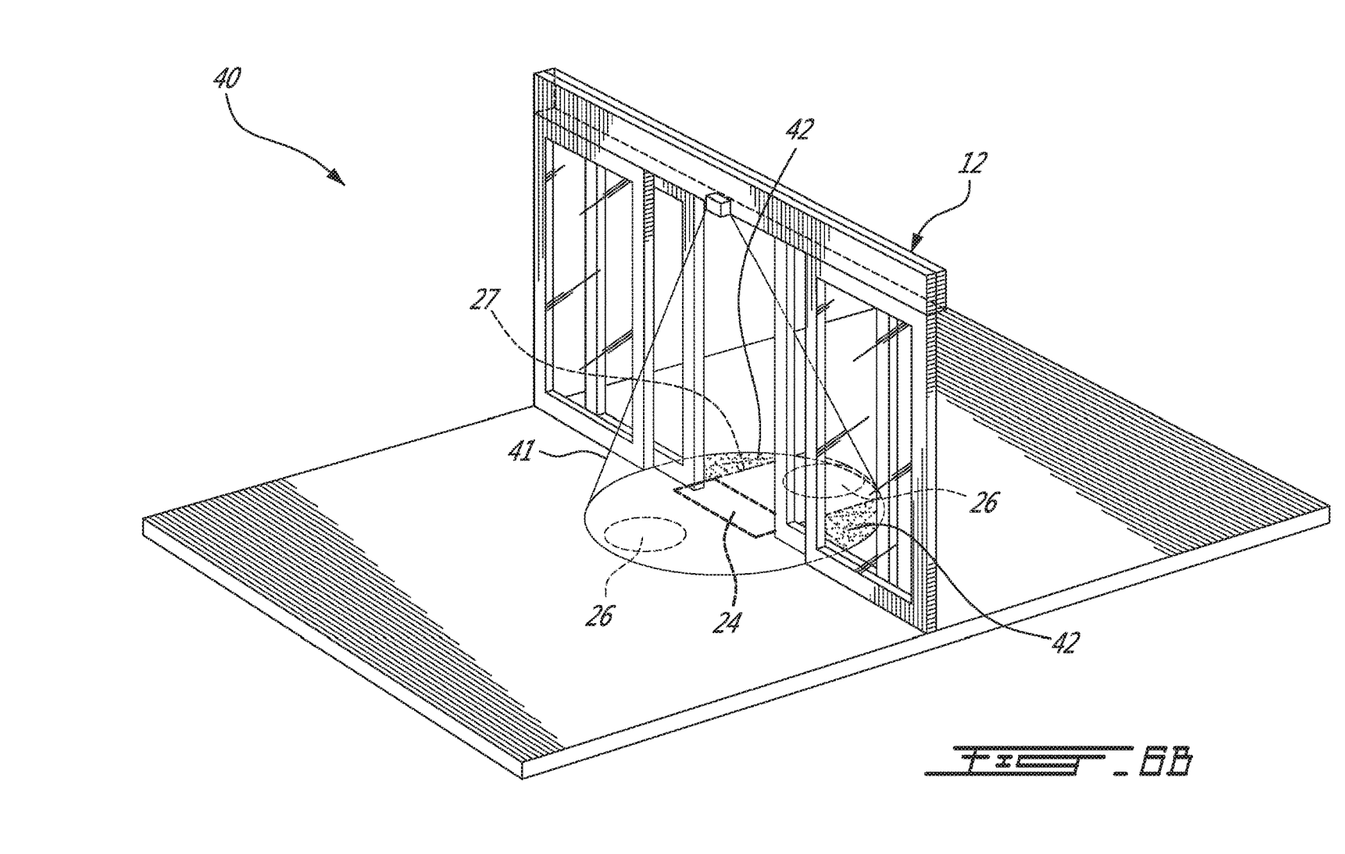

A TOF based detecting system 40 according to a second illustrative embodiment is shown in FIGS. 6A-6B. Since the system 40 is similar to system 10, only the differences therebetween will be described herein for concision purposes.

The system 40 comprises a single camera 14 that is mounted to the door frame 16 on one side of the door 12, resulting in a full FOV 41 in which the safety, activation and counting zones are selected.

According to this embodiment, some portions 42 in the FOV 41 on the side of the door 12 opposite the camera 12 becomes obscured by the door panels 30 as the door 12 closes. Such portions 42 are ignored by the system 40 in its image processing. Of course, the system 40 takes into account the door movements and change the active FOV as the door closes as described hereinabove.

Figure 7:
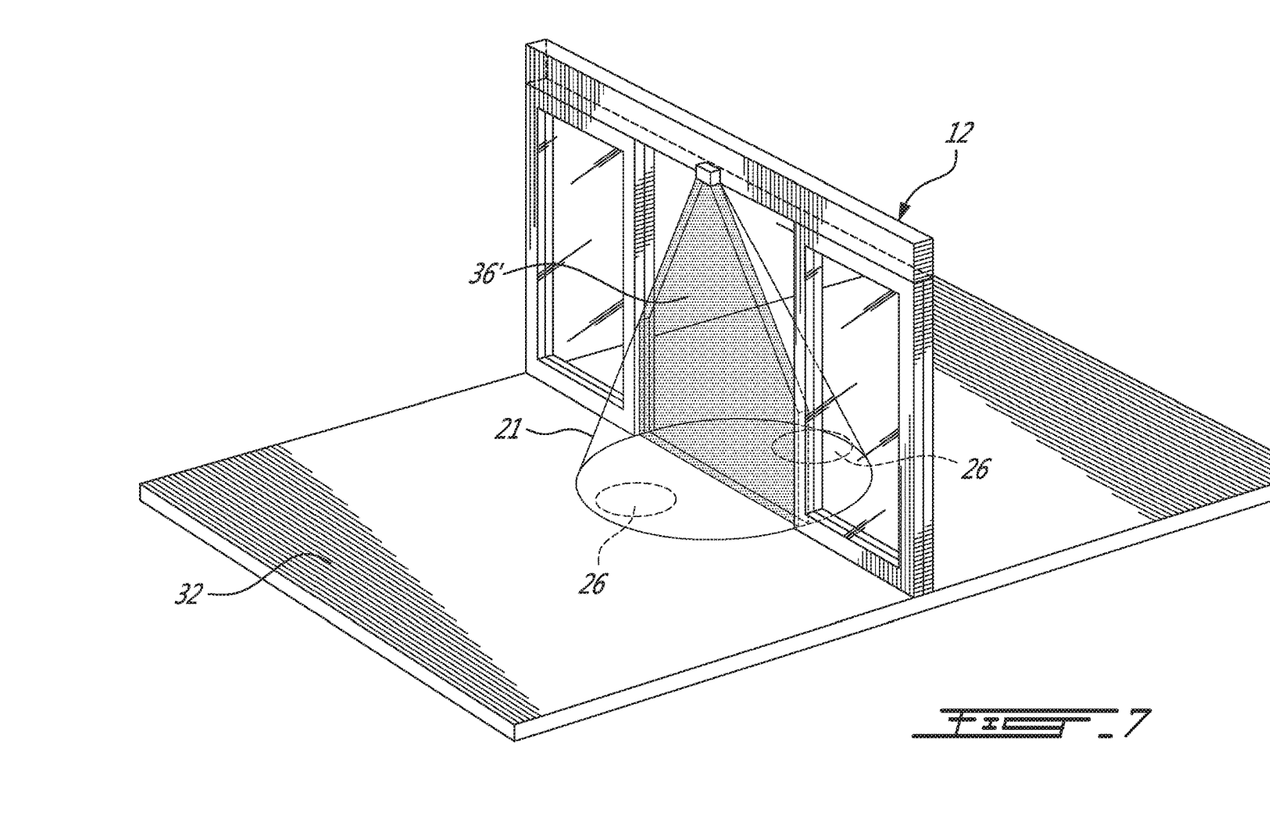
FIG. 7 is a perspective view of an automatic door assembly provided with a TOF based detecting system according to a third illustrative embodiment, illustrating the use of a light curtain.

As can be seen in FIG. 7, illustrating a TOF based detecting system for an automatic door 12 according to a third illustrative embodiment, the safety zone 36' extends from the TOF camera 14 towards the floor 32 so as to define a light curtain. This is achievable considering that the camera 14 allows knowledge of the distance between the camera and a target. The light curtain can be made as small as one-pixel or wider. In such a system, a target (not shown) is detected when it crosses the curtain 36'. More specifically, a target is detected when it obscure part of the floor 32 within the safety zone 36'. According to a more specific embodiment, the configuration of the safety zone 36' is modified dynamically depending on predetermined criteria.

The creation of a crossing zone as illustrated in FIG. 7 allows eliminating a limitation inherent to the use of a TOF camera, which creates a dead zone due to interference between the emitting diodes and the matrix receiver. It is to be noted that the crossing zone may be implemented in parallel with the presence detection method as described for example hereinabove.

It is to be noted that illustrative embodiments of a TOF based detecting system are not limited to any particular number of sensors 14-14', number of zones and zone shape. According to some embodiments (not shown), a single sensor is provided for determining information related to each different aspect of a use of the automatic door, such as activation, safety, counting or else or a same sensor is used for all different aspects. Also, more sensors can be used to increase the resolution, coverage and detecting precision. Of course, the use of TOF cameras with a higher resolution will improve the detection precision, but may require more processing and cost.

As will become more apparent upon reading the following description with reference to further illustrative embodiments, a dual mode system can be provided, wherein one or more ultrasound sensors are included in addition to the TOF camera(s) 14-14'. Since such dual node system is similar to the TOF based system 10 described hereinabove, only the differences therebetween will be described herein for concision purposes.

Figure 8:
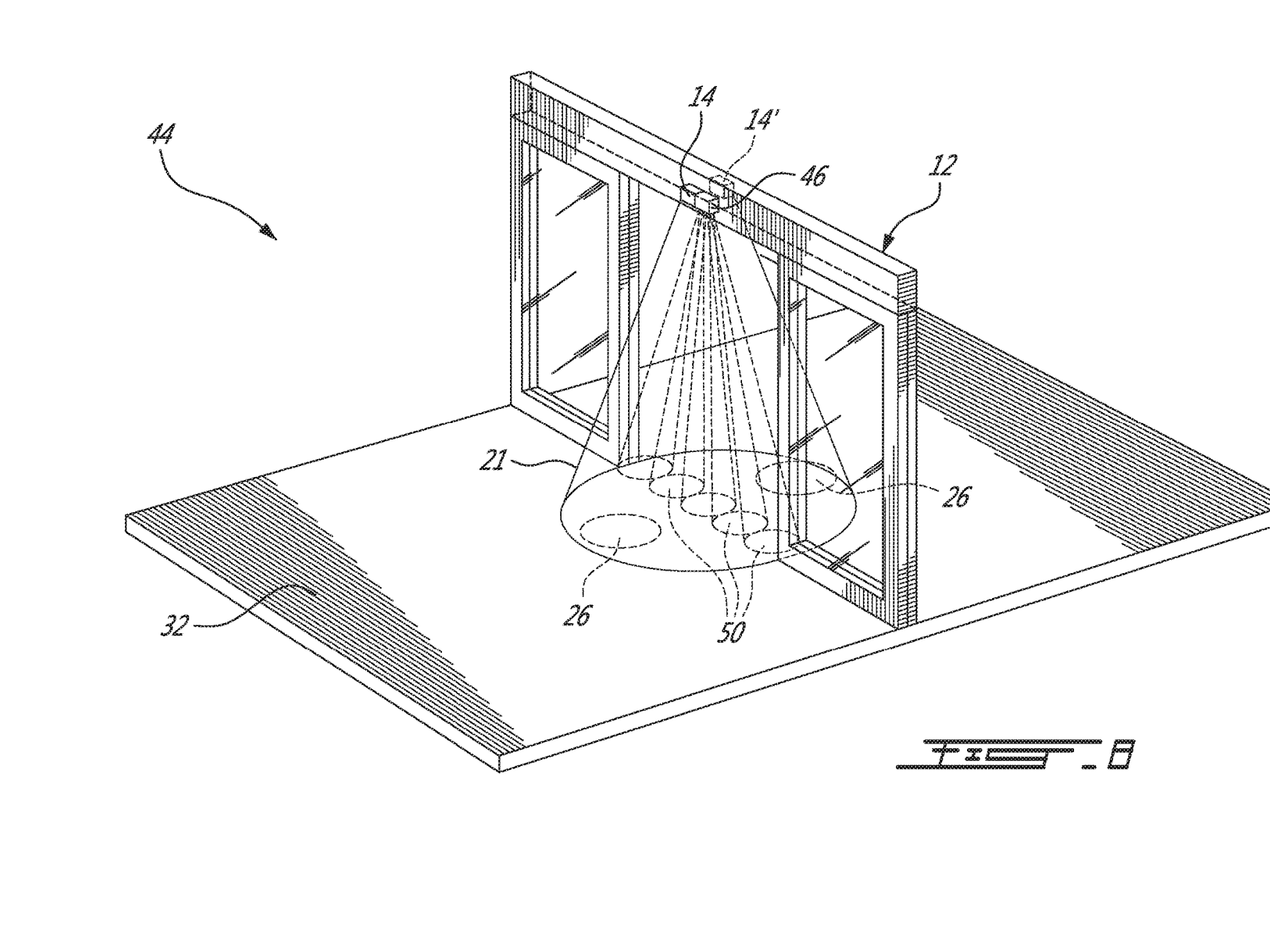
FIG. 8 is a perspective view of an automatic door assembly provided with a dual mode detecting system according to a fourth illustrative embodiment.

A dual mode system 44 according to a fourth illustrative embodiment is shown in FIG. 8 and comprises an ultrasound transducer array 46 having a plurality of ultrasound transducers 48 (see on FIG. 2) coupled to the controller 22 and operable both as emitters and receivers to emit ultrasound detecting cones 50 towards the entrance and to detect when a body enters one of said detecting cones 50. The addition of the ultrasound transducer array 46 aims at improving both the safety and door control abilities of the system 10.

While the dual mode system 44 is shown as having two TOF cameras 14 and 14' such as described with reference to the first illustrative embodiment, it can be implemented with any number of TOF cameras 14. It is to be noted that the cameras can be either a TOF 3D system or a video camera.

According to still another embodiment, separate transducers are provided for the ultrasound emission and detection. Their numbers may also vary.

The system 44 acts on the principle that each of the TOF based and acoustic systems provides complementary information to the other. For example, according to some illustrated embodiments, the acoustic system precisely determines the distance based on reflections in a first spectral range and the TOF based system determines the type (human, non-human), and position of a target. Furthermore, the TOF based system may further create a light curtain configuration as described hereinabove.

For example, if the acoustic system informs the TOF based system of a target in the safety zone, the contrast/intensity is improved in the 3D images to better characterized such target. Also, if the acoustic system sees a false target but the TOF based system does not, then such target is determined by the controller to be static and part of the 'missed learned'.

The acoustic system can be operated so that some of the detecting cones 50 are triggered on/off according to the position of the door panels 30.

Figure 9:
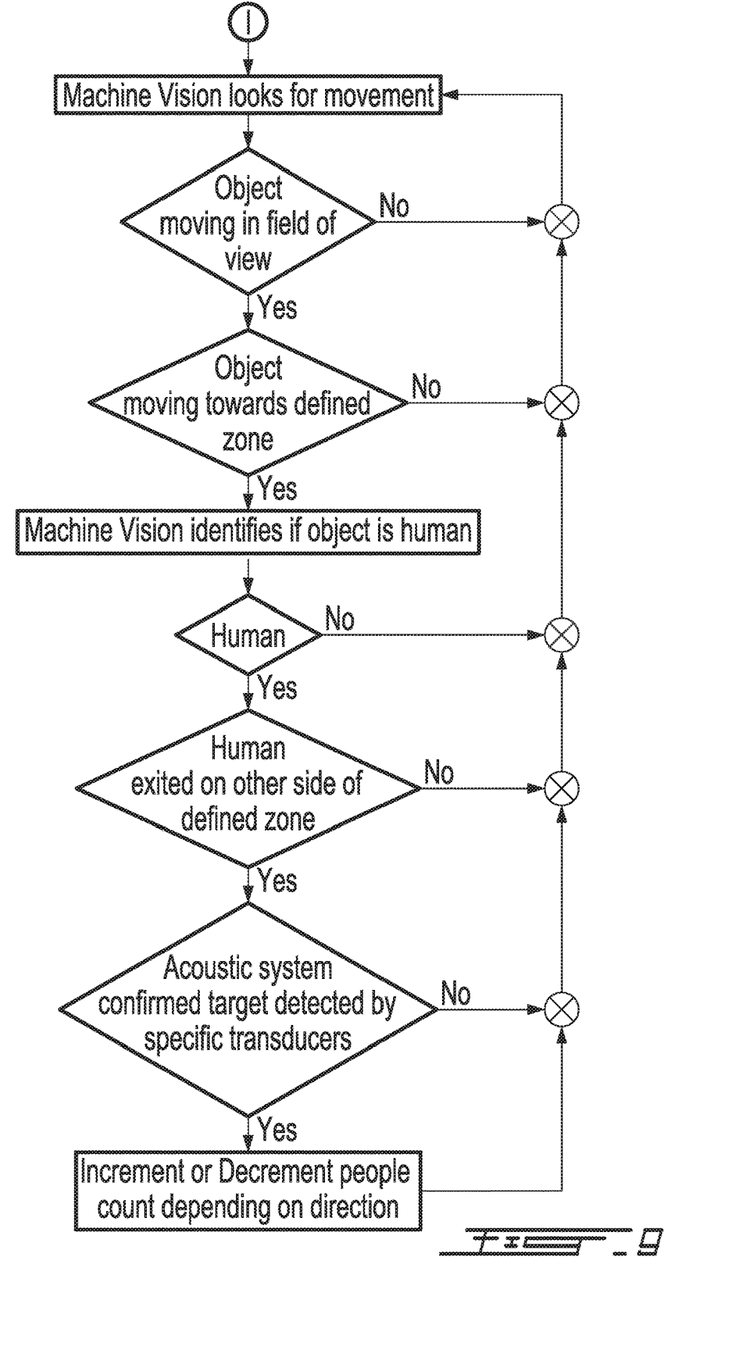
FIG. 9 is a flowchart illustrating the operation of the dual mode detecting system from FIG. 8 for people counting purposes.

The operation of such a dual mode system is illustrated in FIG. 9.

It is to be noted that the expression 'Machine Vision' in FIG. 9 is to be construed as the combination of at least one of the TOF cameras 14 and the controller 22.

Similarly, the expression 'acoustic system' is to be construed in the description and in the claims as including at least one ultrasound transducer 48 and the controller 22, to which they are operatively coupled.

According to such an embodiment, the controller 22 is further used for driving the ultrasound transducers 48 and for receiving and analysing signals therefrom.

According to another embodiment, a further dedicated controller (not shown) coupled to the controller 22 is used to operate the ultrasound transducers 48 and/or for analysing signals therefrom.

Since the operation of an ultrasound transducer is believed to be well known in the art, it will not be described herein in more detail for concision purposes.

During the counting process, the machine vision system uses information gathered by the acoustic system to confirm or determine that there are people going in the counting zone 27. This allows eliminating under counting due to blindness, over counting due to shades or other vision artefacts, and absorption of the signal within the machine vision operational spectrum.

The system may be further configured so that an identification or confirmation by the acoustic system that there are people in the counting zone 27 triggers a change in contrast and or sensitivity of the vision system camera to allow it to detect these persons. If the vision system is still unable to detect a target, then the acoustic detection is adapted and used to verify the legitimacy of the initially detected target.

According to a more specific embodiment, the analysis is such as to allow demographically discriminating detected humans or animals.

According to another embodiment, the vision system additionally or alternatively characterizes the movement of the target and whether it is going towards the safety area. The acoustic system then determines if the object has effectively passed through the counting zone 27, using criteria such as distance and angle. The combined information increases the people counting accuracy.

Figure 10:
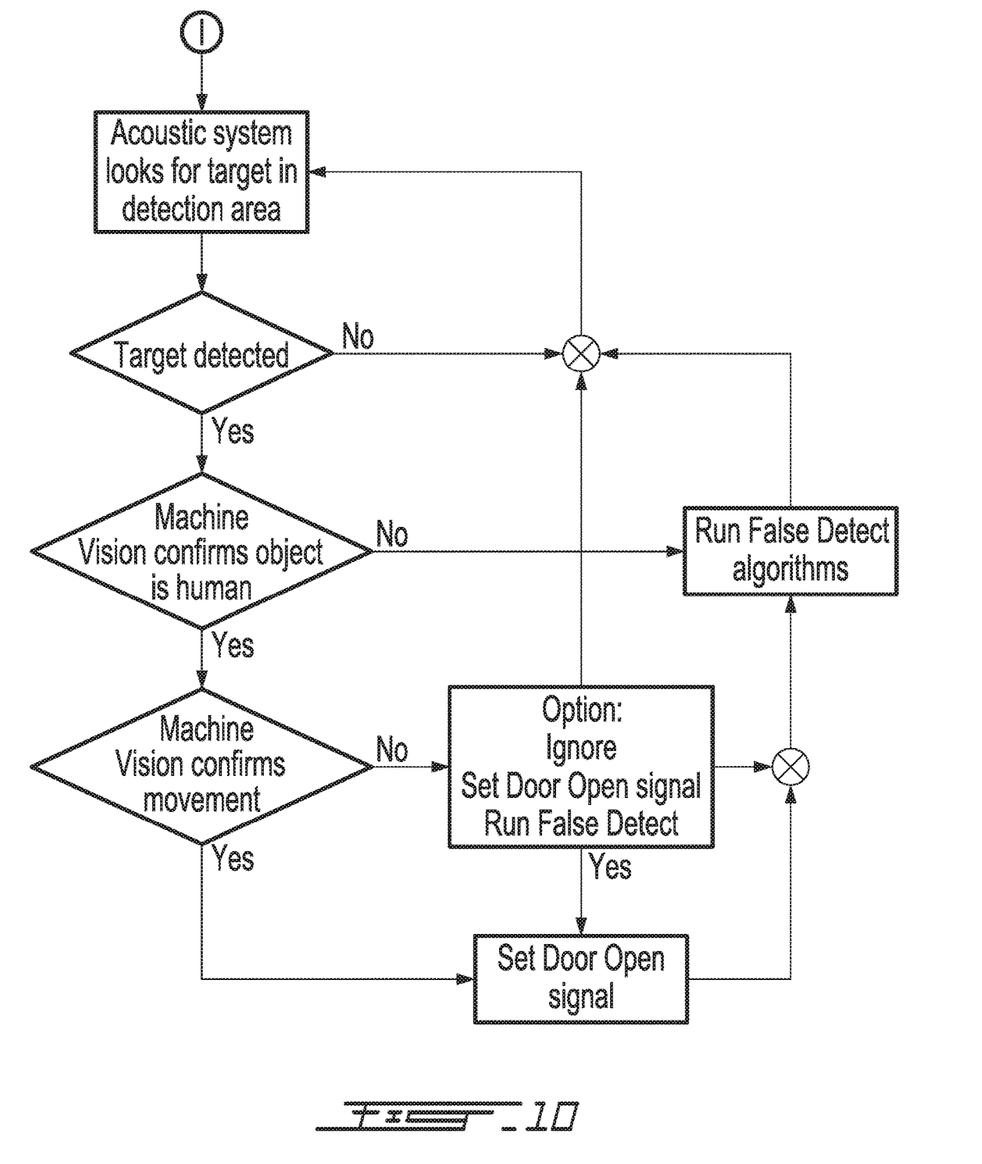
FIG. 10 is a flowchart illustrating the operation of the dual mode detecting system from FIG. 8 for door control and safety purposes.

According to the fourth illustrative embodiment, both the acoustic and machine vision systems can confirm to the other that there is a passenger in a safety zone (see FIG. 10). Either the acoustic or vision system acts as a failsafe system for the other.

Detection of a new target by the acoustic system is based on distance, signal strength and size, or the absence of signal. The machine vision system determines whether it can detect an object (which may be a small object) and, if so, the type of object. Using this information, control of the door 12 (opening/closing/no change) can be made more reliably.

According to another embodiment, each of the TOF based and acoustic system obtains its results independently and either one or a third unit is used to handle the analysis of both system results in order to trigger an action accordingly.

The number and positions of the TOF cameras 14-14' and ultrasound transducers 38 may vary. They can be mounted to the door frame 16, to the door panels 30 and to any other structure nearby having a line of sight to the door 12 or to a region adjacent thereto.

As mentioned hereinabove, the TOF cameras 14-14' and ultrasound transducers 38 are coupled to one or more controllers to provide the above-described functionalities. Such controller is coupled directly or indirectly to the automatic door controller or includes the automatic door control functionalities.

According to a further illustrative embodiment, the acoustic system is configured with adaptive quality i) by triggering on and off selected ultrasound sensors from a sensing assembly depending on their relative position to the door or the relative position of their beam; and/or ii) by modifying the shape and/or size of selected beams.

The acoustic system may further use an adaptive threshold technology, such as the one described in U.S. Pat. No. 7,130,244 B2 issued on Oct. 31, 2006 to Gal et al., that allows adapting the detection to changes in the detecting system environment or an adaptive dead zone technology that modifies the detection zones based on the door position, such as the one described in the U.S. Pat. No. 6,344,642 issued on Feb. 5, 2002 to Agam et al. Furthermore, the system can learn and recognize the door by its acoustic reflection pattern and update the detecting zone accordingly.

Any other type of sensor that is configured to operate outside of the visual spectrum can also be used in a dual mode system in addition to a TOF based detecting sensor.

It is to be noted that many other modifications could be made to the embodiments of an TOF based detecting system for an automatic door as described hereinabove. For example:
the size and geometry of the various detecting zone can be different than illustrated herein;

while illustrative embodiments described herein concern sliding doors, it is believed to be within the reach of a person skilled in the art to adapt the present teaching to other types of door, including without limitations, swing door, revolving doors, baffle, slide glide and pivoting doors.

Even though a TOF based detecting system for an automatic door has been described hereinabove by way of illustrated embodiments thereof, it can be modified. It is therefore to be understood that numerous modifications may be made to the illustrative embodiments and that the scope of the claims should not be limited by the preferred embodiment, but should be given the broadest interpretation consistent with the description as a whole.

The invention claimed is:

1. A detecting system for an automatic door, the system comprising:
   at least one TOF (Time of Flight) camera for taking 3D (three-dimensional) images of a region near the automatic door;
   a controller coupled to the at least one TOF camera for:
      receiving the 3D images from the at least one TOF camera;
      inspecting first portions of the 3D images that correspond to a first zone within the region near the automatic door to determine first information related to a first aspect of a use of the automatic door;
      defining the first zone as a light curtain that is at least one pixel wide and that uses as a reflector a floor surface under the automatic door within or near an entrance defined by the automatic door; whereby, a target being detected by the controller when the target crosses the light curtain, thereby obscuring a reflection of the floor surface; and
      inspecting second portions of the 3D images that correspond to a second zone within the region near the automatic door to determine second information related to a second aspect of the use of the automatic door;
   wherein an inferior limit of the second zone is distanced from the floor.

2. The detecting system of claim 1, wherein at least one of the first and second portions of the 3D images is adapted according to criteria based on at least one of i) a position of the automatic door, ii) a density of targets identified within the 3D images and iii) a fixed target identified within the 3D images.

3. The detecting system of claim 1, wherein the first aspect of a use of the automatic door concerns safety and the second aspect of a use of the automatic door concerns activation of the automatic door or counting of targets crossing the automatic door.

4. The detecting system of claim 3, wherein the first information relates to identification of a target in the first zone that moves towards an entrance defined by the automatic door and the second information relates to a number of targets crossing the automatic door while being in the second zone.

5. The detecting system of claim 1, wherein inspecting at least one of first and second portions of the 3D images further includes i) identifying a target that is relatively immobile and ii) ignoring said target when determining respective first and second information.

6. The detecting system of claim 1, wherein the first zone is a safety zone, the safety zone extending transversally from the door within the region near the automatic door; the safety zone being adapted to remain within an opening defined by the automatic door while the automatic door opens or closes.

7. The detecting system of claim 1, wherein the first zone is a counting zone, wherein inspecting first portions of the 3D images that correspond to the first zone includes searching for a target and for a displacement thereof within the first portions of the 3D images that corresponds to a crossing of the automatic door by the target.

8. The detecting system of claim 1, wherein the first and second portions of the 3D images are respectively first and second group of pixels selected within the 3D images.

9. The detecting system of claim 1, wherein the at least one TOF camera includes two TOF cameras.

10. The detecting system of claim 9, wherein the two TOF cameras have fields of view which overlap over the first zone.

11. The detecting system of claim 9, wherein each of the two TOF cameras is on a respective side of the automatic door.

12. The detecting system of claim 1, wherein the 3D images are received from the at least one TOF camera in a continuous feed manner.

13. The detecting system of claim 1, wherein the controller further simultaneously receives synchronized 3D images from all of the at least one TOF camera and combines the synchronized 3D images into composite images; inspecting first and second portions of the 3D images includes inspecting first and second portions of the composite images.

14. The detecting system of claim 1, wherein the controller is operatively coupled to a door activation controller.

15. The detecting system of claim 1, wherein the controller further acts as a door activation controller.

16. The detecting system of claim 1, wherein the at least one TOF camera is secured to a fixed portion of the automatic door.

17. The detecting system of claim 1, wherein the automatic door is selected from the group consisting of a sliding door, a pivoting door, a revolving door and a baffle door.

18. The detecting system of claim 1, wherein the at least one TOF camera includes a plurality of TOF cameras.

19. A detecting system for an automatic door, the system comprising:
  at least one TOF (Time of Flight) camera for taking 3D (three-dimensional) images of a region near the automatic door;
  a controller coupled to the at least one TOF camera for:
    receiving the 3D images from the at least one TOF camera;
    inspecting first portions of the 3D images that correspond to a first zone within the region near the automatic door to determine first information related to a first aspect of a use of the automatic door;
    defining the first zone as a light curtain that is at least one pixel wide and that uses as a reflector a floor surface under the automatic door within or near an entrance defined by the automatic door; whereby, a target being detected by the controller when the target crosses the light curtain, thereby obscuring a reflection of the floor surface; wherein the first information relates to a target crossing the safety zone; and
    inspecting second portions of the 3D images that correspond to a second zone within the region near the automatic door to determine second information related to a second aspect of the use of the automatic door.

20. A detecting system for an automatic door, the system comprising:
  a TOF camera having a field of view that extends away from the TOF camera towards and up to a floor surface under the automatic door within or near an entrance defined by the automatic door; and
  a controller that defines a light curtain as a portion of the field of view that is at least one pixel wide and that uses the floor surface as a reflector; whereby, a target being detected by the system when it crosses the light curtain, thereby obscuring a reflection of the floor surface.

21. The detecting system of claim 20, wherein the light curtain having a configuration that is adaptable depending on predetermined criteria.

22. The detecting system of claim 20, wherein the light curtain having a configuration that is adaptable depending on a position of the automatic door.

23. The detecting system of claim 20, wherein the portion of the field of view that defines the light curtain is more than one pixel wide.

24. A detecting system for an automatic door, the system comprising:
  a TOF camera having a field of view that extends away from the TOF camera towards and up to a floor surface under the automatic door within or near an entrance defined by the automatic door; and
  a controller that defines i) a light curtain as a first portion of the field of view that is at least one pixel wide and that uses the floor surface as a reflector, ii) a second portion of the field of view that is distinct from the first portion, and iii) a third portion of the field of view; the controller detecting a target a) when the target crosses the light curtain, thereby obscuring a reflection of the floor surface, or b) when the target appears in the second portion of the field of view; the first portion being used for safety, the second portion being used for door activation, and the third zone being used for target counting.

25. The multi-zone detecting system of claim 24, further comprising an acoustic sensor aimed at the entrance; the controller receiving and analysing signals from the acoustic sensor to determine complementary information related to at least one of safety, door activation and a position of the automatic door.

* * * * *